(12) United States Patent
Tam et al.

(10) Patent No.: US 8,982,192 B2
(45) Date of Patent: Mar. 17, 2015

(54) VISUAL INFORMATION DISPLAY ON CURVILINEAR DISPLAY SURFACES

(75) Inventors: Wa James Tam, Orleans (CA); Carlos Alberto Vázquez Hidalgo-Gato, Gatineau (CA)

(73) Assignee: Her Majesty the Queen in right of Canada as represented by the Minister of Industry, through the Communications Research Centre Canada, Ottawa (CA)

( * ) Notice: Subject to any disclaimer, the term of this patent is extended or adjusted under 35 U.S.C. 154(b) by 951 days.

(21) Appl. No.: 13/082,102

(22) Filed: Apr. 7, 2011

(65) Prior Publication Data

US 2012/0256902 A1    Oct. 11, 2012

(51) Int. Cl.
*H04N 13/04*    (2006.01)
*H04N 13/00*    (2006.01)
*H04N 9/31*    (2006.01)
*G02B 27/22*    (2006.01)

(52) U.S. Cl.
CPC ....... *H04N 13/0488* (2013.01); *H04N 13/0497* (2013.01); *H04N 13/0409* (2013.01); *H04N 13/0447* (2013.01); *H04N 13/0459* (2013.01); *H04N 13/0404* (2013.01); *H04N 9/3185* (2013.01); *G02B 27/22* (2013.01)
USPC ............... 348/51; 348/42; 348/59; 348/744

(58) Field of Classification Search
USPC ........................................ 348/42, 51, 59, 744
See application file for complete search history.

(56) References Cited

U.S. PATENT DOCUMENTS

| | | | |
|---|---|---|---|
| 1,592,034 | A | 9/1924 | Macy |
| 6,389,236 | B1 | 5/2002 | Western |
| 6,614,427 | B1 | 9/2003 | Aubrey |
| 6,905,218 | B2 | 6/2005 | Courchesne |
| 7,796,134 | B2 | 9/2010 | Vesely et al. |
| 2010/0128112 | A1 | 5/2010 | Marti et al. |

OTHER PUBLICATIONS

"Luc Courchesne" downloaded Apr. 7, 2011 from http://dynamicmedianetwork.org/people/luc-courchesne, 3 pages.
Cruz-Neira et al., "Surround-Screen Projection-Based Virtual Reality: The Design and Implementation of the CAVE," 1993, Proceedings of the 20$^{th}$ Annual Conference on Computer Graphics and Interactive Techniques, pp. 135-142.
Hughes, "An Introduction to Making Phantograms," Jul. 7-12, 2004, NSA, 63 pages.

(Continued)

*Primary Examiner* — Geepy Pe
(74) *Attorney, Agent, or Firm* — Hope Baldauff LLC

(57) ABSTRACT

Three-dimensional visual information may be displayed on curvilinear display surfaces. The display devices can include a control system configured to execute various methods for obtaining the visual information and displaying the visual information on the curvilinear display surface. If the visual information is intended for display on a first display surface, the control system can modify the visual information for display on the curvilinear display surface. The control system also can modify the visual information based upon relative positions and orientations of a viewer, projector, and/or the display surface, as well as to correct for anticipated environmental or optical interference. The control system outputs the visual information or modified visual information to a display device for display on a curvilinear display surface.

25 Claims, 9 Drawing Sheets

(56) References Cited

OTHER PUBLICATIONS

Kaneko et al., "Desktop Autostereoscopic Display Using Compact LED Projector," 2003, Proceedings of SPIE-IS7T Electronic Imaging, vol. 5006, 9 pages.

Ohshima et al., "A Stereoscopic Projection Display Using Curved Directional Reflection Screen," 1997, SPIE, vol. 3012, 5 pages.

Peternier et al., "Practical Design and Implementation of a Cave System," downloaded Apr. 7, 2011 from http://vrlab.epfl.ch/~apeternier/publications/GRAPP07_practicalCAVE.pdf, 8 pages.

Strickland, "How Virtual Reality Gear Works: Virtual Reality and the CAVE," downloaded Apr. 7, 2011 from http://electronics.howstuffworks.com/gadgets/other-gadgets/VR-gear2.htm, 3 pages.

Takahashi et al., "Holographic lens array increases the viewing angle of 3D displays," Jun. 19, 2006, SPIR Newsroom, 2 pages.

Tam, "Technologies in Development," downloaded Apr. 7, 2011, from http://www.crc.gc.ca/en/html/crc/home/3d/video_transfer/development, 3 pages.

Yang et al., "Curved Display Technology Based on Glass Substrates," Dec. 10, 2009, the 16th International Display Workshops, 4 pages.

Dodgson, Neil A., "Autostereoscopic 3D Displays," Computer, vol. 38(8), pp. 31-36, 2005.

"AUO Showcases Curved Display Technology at SID," Nikkei Electronics Asia, May 20, 2008, Copyright © 1995-2014 Nikkei Business Publications, Inc., Retrieved from the Internet URL: http://techon.nikkeibp.co.jp/english/NEWS_EN/20080520/152014/ on Sep. 18, 2014, pp. 1-2.

"Immersive 3D," Retrieved from the Internet URL: http://www.visbox.com, on Sep. 18, 2014, © Copyright 2014 Visbox, Inc., pp. 1-1.

Sumner, L., "AU Optronics Shows off Curved LCD Screen," IDG News Service, May 20, 2008, © 1998-2014, IDG Consumer & SMB, Retrieved from the Internet URL: http://www.pcworld.com/article/146083/article.html on Sep. 18, 2014, pp. 1-2.

Tam, W.J. and Vázquez, C., "Development of a novel virtual reality 3D display: the 'J-Display'," Proceedings of International Display Workshops (IDW'10), Dec. 1-4, 2010, Fukuoka, Japan.

VISUAL INFORMATION DISPLAY ON CURVILINEAR DISPLAY SURFACES

BACKGROUND

Unless otherwise indicated herein, the materials described in this section are not prior art to the claims in this application and are not admitted to be prior art by inclusion in this section.

One of the challenges in designing display devices such as three-dimensional ("3D") and virtual reality platforms is increasing the level of realism provided by the display devices so the scenes, people, and/or other objects displayed by the display devices closely resemble the corresponding scenes, people, and/or other objects in the real world. Display device designers have made various attempts to address this challenge through high resolution display devices, large-scale display devices with extended display limits, increased intensity lights sources, and bright vivid displays that are capable of displaying a large number of colors and/or simultaneously displaying a large number of color combinations.

Additionally, the drive for more realistic display technologies has, over the past few years, led to an increased popularity with respect to 3D displays. 3D displays can provide viewers with a more realistic and immersive viewing experience than many of their two-dimensional ("2D") counterparts. While the popularity of 3D technologies has increased recently, current 3D technologies inherently fail to address some limitations that continue to limit the level of realism provided by the display devices embodying these 3D technologies.

For example, 3D displays convey visual information within a visual space that is delimited and/or defined by the direct line of sight from the eye of a viewer to the edges of a 3D display. These viewing limits associated with 3D displays can result in clipping of 3D objects displayed by the 3D displays. Thus, some 3D objects may appear unrealistic, as parts of the 3D objects are clipped by the bottom edge(s) of an image and/or lack appearance of support from natural support structures. While object positioning and sizing during image capture for depiction on the 3D displays can be altered to reduce the clipping of 3D objects, the clipping is difficult to eliminate without also removing natural support structures. As such, limitations of current 3D display devices may limit the popularity of 3D displays in the display device marketplace.

SUMMARY

The present disclosure generally describes concepts and technologies for displaying visual information on curvilinear display surfaces. According to various embodiments of the concepts and technologies disclosed herein, visual information is displayed onto or by display systems that include a curvilinear display surface. The visual information can include, but is not limited to, 3D stereoscopic and 3D multi-view stereoscopic information. A control system associated with the display system is configured to obtain visual information and display the visual information on the curvilinear display surface. In some embodiments, the visual information is configured for display on the curvilinear display surfaces, and in some embodiments, the visual information is captured with a configured for display on a first type of display surface such as a planar surface or the like. Thus, in some embodiments, the control system is configured to modify the visual information for display on the curvilinear display surface, and output modified visual information for display on the curvilinear display surface. The control system is configured to modify the visual information based upon known shape and configuration differences between a reference surface associated with the visual information and an actual surface on or by which the visual information is to be displayed. The control system also is configured to modify the visual information to take into account optical or environmental interference anticipated during projection of the visual information.

In some implementations, 3D objects displayed onto or by the curvilinear display surface appear to be supported by natural support structures. As such, use of the curvilinear display surface can reduce the clipping of the 3D objects when displayed onto or by the curvilinear display surfaces relative to other 3D displays. Thus, the level of realism associated with 3D displays having a curvilinear display surface can be greater relative to 3D displays with other shapes and/or configurations. Furthermore, visual information can be projected onto the curvilinear display surface by a single projector, if desired, or can be displayed on the curvilinear display surface by an imaging system integrated into the curvilinear display surface.

The curvilinear display surface can be configured with a portion extending toward a viewer. Thus, depicted objects and/or other scenery displayed at the portion extending toward the viewer can correspond to objects or scenery that are closer in actuality and/or in the scene embodied by the visual information. Thus, viewers of the objects or other scenery depicted on the curvilinear display surface can view the objects or other scenery more comfortably relative to a planar or other surface. Similarly, effects of an accommodation-convergence issue that often is associated with planar and/or other upright displays can be reduced and/or eliminated through use of the curvilinear display surface. For example, some planar and/or upright displays force users to focus on a fixed distance corresponding to a viewing distance of the display, though images within the display would be viewed at contrasting distances if encountered in the real world. The curvilinear display surface can provide contrasting distances for display of the objects, thereby more closely approximating the real world than many traditional display surfaces. Thus, a viewer of the curvilinear display surface may experience a more comfortable, realistic, and enhanced viewing experience relative to a viewing experience associated with a traditional display.

An example display device may include a curvilinear display surface and can communicate with or include a control system. The control system may be configured to perform methods for displaying visual information on curvilinear display surfaces. Some example methods may include obtaining the visual information, the visual information being configured for display on a substantially planar display surface. Example methods further may include processing the visual information for display on a substantially continuous curvilinear display surface. A viewing surface at a first region of the curvilinear display surface can be substantially perpendicular to the viewing surface at a second region of the curvilinear display surface. Example methods further may include displaying the visual information on the curvilinear display surface. The present disclosure generally also describes computer storage media for storing instructions executable by computers to provide various methods, including the example methods disclosed herein for displaying visual information on curvilinear display surfaces.

The present disclosure generally also describes an example apparatus for displaying visual information configured for display on a substantially planar display surface. Some example apparatus include a substantially continuous curvilinear display surface. Although the display surface is a continuous unitary display surface, the shape of the display surface can be described as having three regions or portions. For example, the display surface can be described as having a first region or portion, a second region or portion, and a third region or portion. The first region or portion can correspond to a region of the display surface that is oriented in a first orientation. The second region or portion can correspond to a curved region or portion of the display surface and can be adjacent the first region or portion. The third region or portion can be adjacent the second region or portion and can correspond to a region of the display surface that is oriented in a second orientation. In some embodiments, a viewing surface of the display surface at the first region or portion can be substantially perpendicular to the viewing surface of the display surface at the third region or portion.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
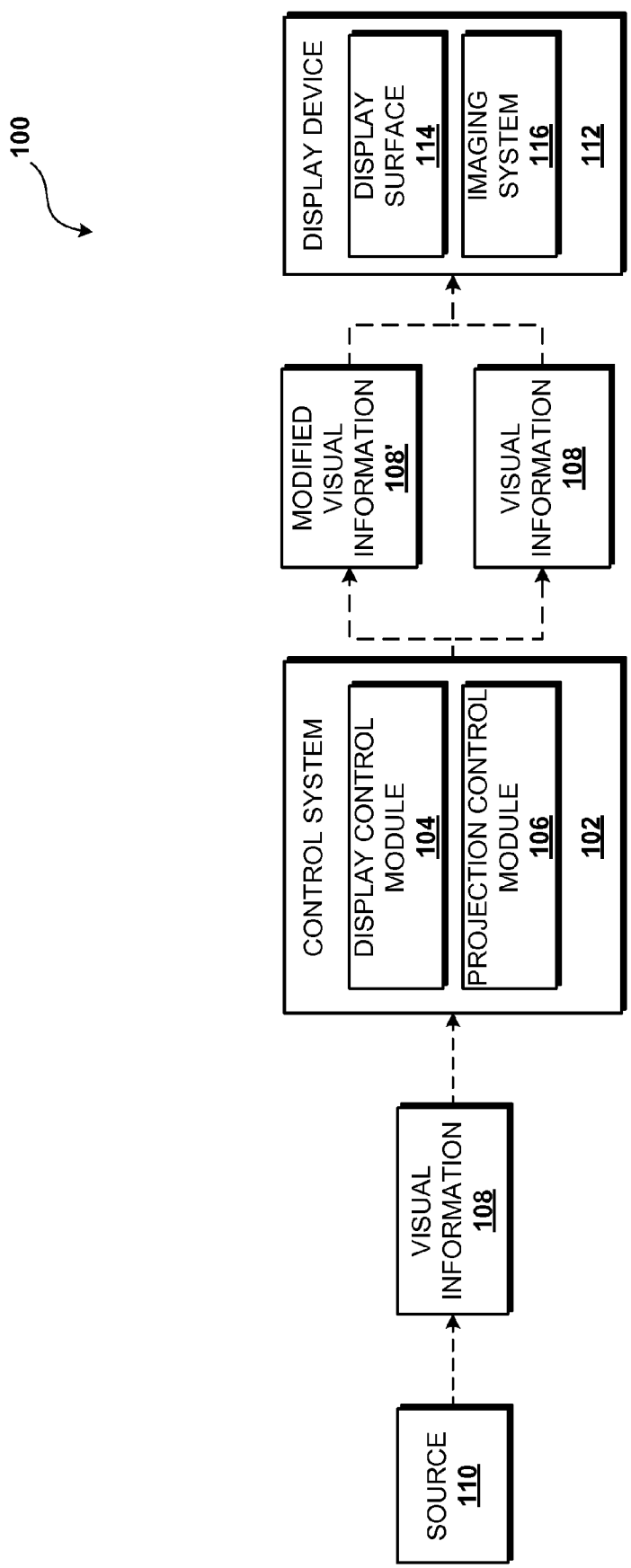
FIG. 1 is a system diagram illustrating a system for displaying visual information on curvilinear display surfaces.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the FIGURES, can be arranged, substituted, combined, separated, and designed in a wide variety of different configurations, all of which are explicitly contemplated herein.

This disclosure is generally drawn, inter alia, to displaying visual information on curvilinear display surfaces. In an illustrative example, display devices include a curvilinear display surface. The display devices can be configured to solve a grounding problem that can be inherent to existing display devices. As explained herein, "grounding" refers to the perceived support for virtual objects viewable in 3D virtual images. For example, a 3D image may include a flower that is virtually projected in free space, and therefore appears to float in a free space between a display surface and a viewer viewing the display surface from a viewpoint. As the 3D virtual image zooms into the image of the flower, the stem of the flower and the ground on which the flower grows may be cropped out of the visible limits of the image. At some point, the flower will appear to float in free space, without any stem or ground visible in the viewable scene. Thus, the flower will no longer be "grounded" in the virtual image. This phenomenon is referred to herein as a lack of "grounding."

According to various embodiments disclosed herein, methods, apparatuses, and computer storage media are disclosed for addressing the grounding problem mentioned above, and thereby enhancing the virtual presence associated with the display devices. A grounded curvilinear display surface can be provided. The curvilinear display surface can have a contour that can be expressed as or defined by a function. The contour can correspond to a substantially continuous unitary surface having a shape that varies with respect to location on the curvilinear display surface. The shape of the curvilinear display surface is described herein with reference to three or more regions or portions of the contour, though the display surface is, in fact, unitary and continuous, and has no divisions.

The regions can include a horizontally oriented portion of the curvilinear display surface that extends toward a viewer or an anticipated viewpoint along a horizontal surface, level, or axis such as a floor, desktop, other suitable surface, or in free space. The curvilinear display surface further can include a curved region or portion in which the orientation of the display surface shifts from a horizontal orientation to a substantially vertical orientation. A third region or portion of the curvilinear display can include a substantially planar vertical region or portion that extends up from the floor or other horizontal surface, reference point, or reference axis. The third region or portion can be substantially vertically oriented, or can gradually extend away from the anticipated viewpoint to further enhance the perceived realism of the depicted objects in the virtual scene of the display device. It bears repeating that the curvilinear display surface is configured as a continuous unitary display surface, and that the regions and/or portions referred to herein refer to the shape or contour of the display surface, not to separate or distinct display surface portions.

According to various embodiments, the display device is configured as a self-illuminating display device. In some embodiments, for example, the display device includes a plasma display surface, an organic light emitting diode ("OLED") display surface, or other suitable display surface of a suitable technology. The display device also can include a liquid crystal display ("LCD") surface. In some other embodiments, the display device includes a projector configured to project visual information onto the display surface. According to various embodiments, the display device is configured to use one projector to display the visual information on the display surface. In other embodiments, however, multiple projectors can be used.

In some embodiments, a control system associated with the display device can be configured to process visual information configured for display on a first display surface with a first shape, size, layout, and/or configuration. The control system can modify the visual information so the visual information can be displayed on a second display surface with a second shape, size, layout, and/or configuration. Additionally, the control system can be configured to correct or modify the visual information to correct for optical interference or environmental conditions that otherwise may affect the quality of the viewable image projected by or on a display surface.

In some embodiments, the visual information is only processed, if at all, to address visual distortion and/or to address relative differences and orientations between viewers, projectors, and the display surface. In particular, the visual information can be captured such that the visual information is, by default, configured for viewing on the display device. For example, specialized capture devices, lenses, light sensors, and the like, can be employed to capture visual information configured for display on the display device. It should be understood that the visual information can be processed optically instead of, or in addition to, digital processing.

The display device can be used to display any desired visual information including, but not limited to, static images, text, photographs, video, and/or other information configured in 2D and/or 3D. In some contemplated embodiments, the display devices are configured to display stereoscopic or multiview content. The display devices can be used to provide an immersive and realistic experience to viewers and/or to address the grounding problem described herein. Thus, the viewing experience and/or level of realism experienced by viewers can be enhanced, relative to other display device technologies. These and other aspects of systems and methods for displaying visual information on curvilinear display surfaces will be described in more detail herein.

Referring now to FIG. 1, a system diagram illustrating a system 100 for displaying visual information on curvilinear display surfaces arranged according to at least some embodiments presented herein will be described. The system 100 includes a control system 102. The control system 102 is configured to execute one or more application programs such as, for example, a display control module 104, a projection control module 106, and/or other application programs. It should be understood that some, none, or all of the functionality described herein with respect to the control system 102, the display control module 104, and/or the projection control module 106 can be provided by a combination of hardware and software. As such, the illustrated embodiment should be understood as being illustrative.

Furthermore, although the display control module 104 and the projection control module 106 are illustrated as components of the control system 102, it should be understood that each of these components, or combinations thereof, may be embodied as or in stand-alone devices or components thereof operating independently and/or in conjunction with one another. Additionally, although not illustrated in FIG. 1, it should be understood that each of the display control module 104 and the projection control module 106 can operate on or in communication with a network (not shown in FIG. 1), and that therefore the display control module 104 and the projection control module 106 may communicate with one another via direct connections and/or via network connections. Thus, the illustrated embodiment is an example of one contemplated embodiment, and should not be construed as being limiting in any way.

The display control module 104 is configured to obtain visual information 108 from one or more sources 110 and to output the visual information 108 for display at a display device 112. In some embodiments, the control module 104 is configured to obtain the visual information 108 from the sources 110, to modify the visual information 108 for display at the display device 112, and to output modified visual information 108' for display or further operations by the projection control module 106 and/or other modules or applications. Thus, embodiments of the display control module 104 are configured to output the visual information 108 configured for display at various types of display devices 112 and/or to output modified visual information 108', as is explained in more detail herein. According to various implementations, the visual information 108 includes 2D or 3D content including, but not limited to, animated content, video, still images, text, photographs, slide shows, presentations, and/or other content. The visual information 108 can include stereoscopic and multiview stereoscopic 3D content. In some implementations, the visual information 108 corresponds to output from the source 110, streaming or downloadable content from the source 110, and/or data retrieved from the source 110, wherein the source 110 corresponds to a data storage device or data storage medium.

More particularly, according to various embodiments, the source 110 includes a personal computer ("PC") such as a desktop, tablet, or laptop computer system, and the visual information 108 includes video output associated with the source 110. In other embodiments, the source 110 includes other types of computing systems such as server computers, handheld computers, netbook computers, embedded computer systems, personal digital assistants, mobile telephones, smart phones, set-top boxes ("STBs"), digital video recorders ("DVRs") and/or other computing devices, one or more of which can store, host, stream, and/or make available for download the visual information 108. The source 110 also can include other sources of the visual information 108 such as Internet connections providing streaming or downloadable content, satellite sources, cable television sources, analog and/or digital antenna sources, media players and/or other data storage devices, video cassette players, digital versatile disk ("DVD") players, compact disk ("CD") players, laserdisc layers, mini-disc players, and/or other data storage devices, data sources, and/or media players.

It should be understood that the above examples of the source 110 are illustrative, and that the visual information 108 can be received from or generated by any suitable devices and/or sources. It should also be understood that the control system 102 can receive the visual information 108 from the sources 110 via one or more network connections, if desired. Furthermore, while the embodiments described herein often refer to video and/or other animated forms of visual information 108, it should be understood that the concepts and technologies disclosed herein can be used to display any type of visual information 108 including, but not limited to, photographs, text, slide shows, maps, and/or other types of content.

The projection control module 106 is configured to modify the visual information 108 and/or the modified visual information 108'. For example, the projection control module 106 can modify the visual information 108 and/or the modified visual information 108' to account for relative positions and/or orientations of viewers, projectors, and/or one or more surfaces onto which the visual information 108 and/or the modified visual information 108' is displayed, and/or to correct for various types of optical interference that may be introduced during display of the visual information 108 and/or the modified visual information 108'. The visual information 108 and/or the modified visual information 108' are not necessarily modified, as explained herein. The optical interference may be introduced in a number of ways including, but not limited to, environmental conditions, hardware features and conditions, display surface features, ambient lighting, movement of projection devices or display surfaces, and/or in other ways.

In one embodiment, the projection control module 106 applies one or more algorithms to the visual information 108 and/or the modified visual information 108' to account for visual distortion introduced during projection of the visual information 108 and/or the modified visual information 108'. Visual distortion can exist due to positioning of a projector used to project the visual information 108 and/or the modified visual information 108' relative to a display surface onto which the visual information 108 and/or the modified visual information 108' is projected. In one example embodiment, the control system 102 is configured to modify the visual information 108 to account for distortion by applying keystone correction to the visual information 108. It should be understood that this embodiment is illustrative, and should not be construed as being limiting in any way.

As will be explained in more detail herein, particularly with reference to FIG. 3, the display device 112 illustrated in FIG. 1 can include various components. In particular, the display device 112 can include or can be coupled to a display surface 114 and an imaging system 116. According to various embodiments, the display surface 114 and the imaging system 116 are integrated with one another, for example, as an LCD display with an integrated light source. According to other embodiments, the visual information 108 or the modified visual information 108' is projected onto the display surface 114 by the imaging system 116, wherein the imaging system 116 includes a projector configured to project the modified visual information 108' onto the display surface 114. It should be understood that the visual information 108 and/or the modified visual information 108' can be projected onto the display surface from the front or back.

In some embodiments, the visual information 108 is captured with a capture device configured to capture the visual information 108 for display on the display surface 114. As will be explained in more detail below, the display surface 114 can have a curvilinear shape and/or contour. Thus, in some embodiments, a capture device used to capture the visual information 108 has a curved light sensor such as a charged-coupled device (CCD), complimentary metal-oxide-semiconductors (CMOS), other imaging devices, and the like. Similarly, it should be understood that digital image processing of the visual information 108 also may not be required, even if the visual information is formatted for display on a planar surface. For example, in some embodiments, some or all of the functionality described herein with respect to the projection control module 106 can be provided by purely optical structures such as lenses and/or other optical devices. Thus, the description of modifying the visual information 108 should be viewed as illustrative of the concepts and technologies disclosed herein, and not as limiting in any way the scope of the claims.

Furthermore, according to various embodiments, the control system 102 is configured to skew, warp, or otherwise modify the visual information 108 such that the modified visual information 108' can be projected or otherwise displayed on the display surface 114 with one projector or other imaging system 116. As such, the system 100 includes, in various embodiments, only one imaging system 116 such as a projector, an LCD display surface, or other device. Therefore, the control system 102 does not need to be configured to generate multiple images and/or to blend the images together to present the visual information 108 to a viewer. As used herein, the term "display device 112" refers to one or more or a combination of a projection system, an illumination or lighting source, or other imaging system 116, as well as an imaging system or other imaging device configured to form desired images or representations on the display surface 114 such as LCD display surfaces, OLED display surface, light-emitting-diode ("LED") display surfaces, plasma display surfaces, other types of display surface, combinations thereof, and the like. It should be understood that the control system 102 and the display device 112 can be integrated into a housing or other container, if desired. Thus, the embodiments illustrated in FIG. 1 should be understood as being illustrative of one contemplated embodiment, and should not be construed as being limiting in any way.

FIG. 1 illustrates one control system 102, one source 110, and one display device 112. It should be understood, however, that some implementations of the system 100 may include multiple control systems 102, multiple sources 110, and/or multiple display devices 112. Thus, the illustrated embodiments should be understood as being only an example, and should not be construed as being limiting in any way.

Figure 2:
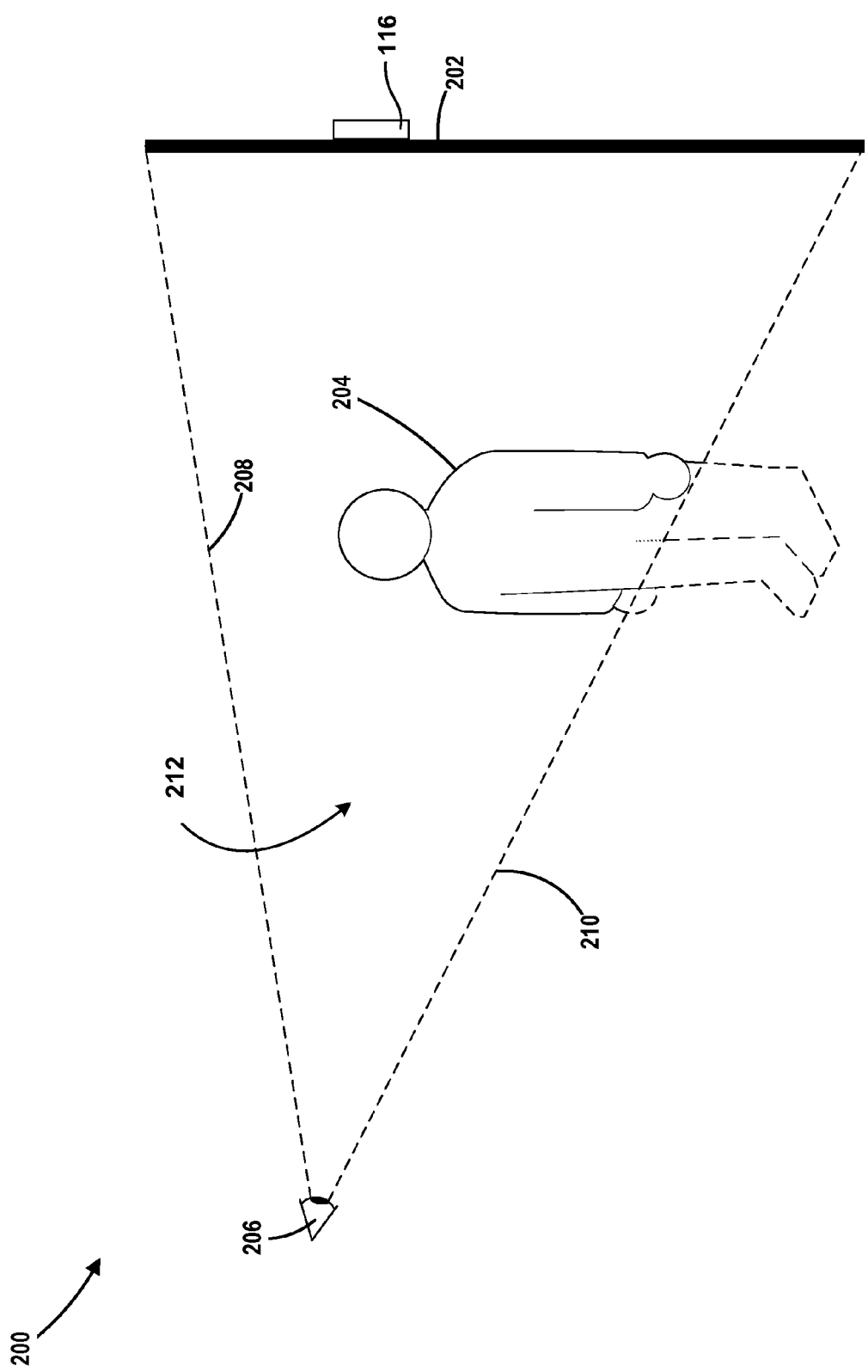
FIG. 2 is a schematic diagram illustrating a display system.

Turning now to FIG. 2, a schematic diagram illustrating a display system 200 arranged according to at least some embodiments presented herein will be described. The display system 200 includes a substantially planar display surface 202. In some embodiments, the display surface 202 displays 2D or 3D content. The display surface 202 may include hardware and/or software for displaying content via projection or self-illumination such as the imaging system 116 described above with reference to FIG. 1. In the illustrated embodiment, the display system 200 displays 3D content. A virtual object 204 is created by the display system 200 when the display surface 202 is viewed from a particular viewpoint 206.

When viewed from the viewpoint 206, the visual limits of the display surface 202 are defined by the illustrated limit lines 208, 210. Thus, the limit lines 208, 210 can define visual limits of a viewable space 212 in which virtual objects displayed by the display surface 202 appear. As shown in FIG. 2, the visual limits of the viewable space 212 can result in clipping of the virtual object 204. In particular, when the display surface 202 is viewed from the viewpoint 206, a person or other object such as the virtual object 204 can appears to float in open space at a virtual location in front of the display surface 202 without any visible support in the viewable space 212 existing between the viewpoint 206 and the display surface 202. As such, the virtual presence or virtual reality of the displayed virtual object 204 may be reduced or otherwise negatively impacted due to the apparent lack of support for the virtual object 204.

In the illustrated embodiment, the virtual object 204 corresponds to a depiction of a human being virtually located in open space in front of the display surface 202. As shown in FIG. 2, the limit line 210 clips the virtual object 204, such that the legs of the human being are not visible in the viewable space 212. As such, the human being appears to have no support and appears less realistic than otherwise would be possible if the virtual object 204 was not clipped by the limit line 210. The lack of visible support for a virtual object 204 in a viewable space 212 is referred to herein as a lack of "grounding," or a "grounding problem." Similarly, a virtual object 204 having visible support in the viewable space 212 is referred to herein as being "grounded." It will be appreciated that even if the vertical limits of the display surface 202 are increased by moving the viewpoint 206 closer to the display surface 202 or increasing the viewable size of the display surface 202, the grounding problem noted above may still exist for some, none, or all virtual objects 204 visible in the viewable space 212.

Figure 3:
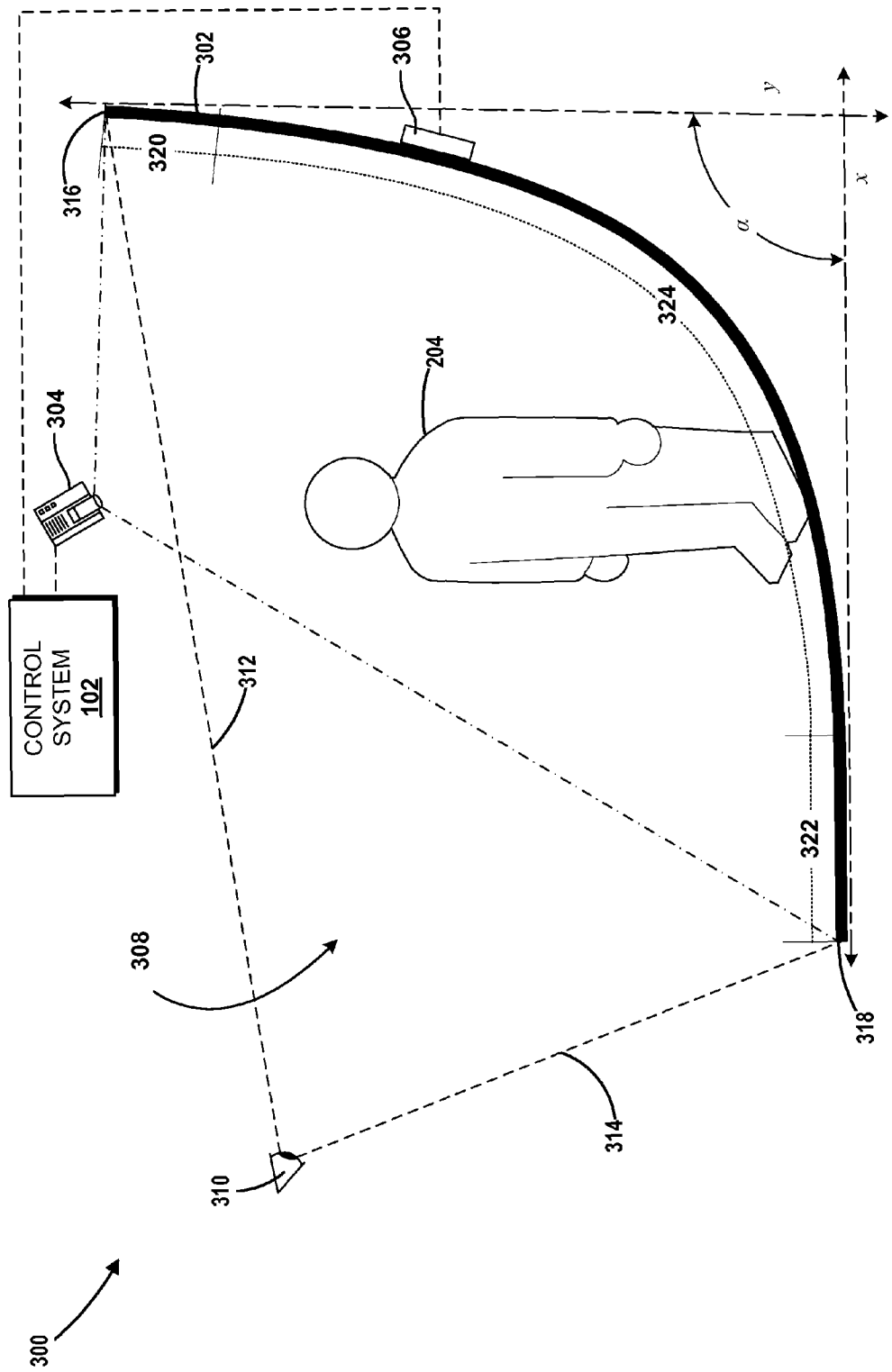
FIG. 3 is a schematic diagram illustrating a display system including a curvilinear display surface.

Turning now to FIG. 3, a schematic diagram illustrating a display system 300 including a curvilinear display surface 302 arranged according to at least some embodiments presented herein will be described. More particularly, FIG. 3 illustrates a display system 300, which may include one or more components of the system 100 illustrated in FIG. 1, and which may be utilized to correct or avoid the grounding problem described above with reference to FIG. 2. In FIG. 3, it will be appreciated that the curvilinear display surface 302 can include one embodiment of the display device 112 illustrated in FIG. 1. As such, the curvilinear display surface 302 can correspond to the display surface 114 described herein, and the display system 300 further can include the control system 102, and a projection system 304, a backlight or other illumination or lighting source, LCD, OLED, LED, plasma or other imaging technologies, and/or other imaging software and/or hardware 306 including, but not limited to, the various embodiments of the imaging system 116 described above.

As shown in FIG. 3, the virtual object 204, also illustrated as being presented in FIG. 2, can be presented in a viewable space 308, when viewed from a viewpoint 310. The limits of the viewable space 308 can be defined in FIG. 3 by the limit lines 312, 314. In FIG. 3, the object 204 is visible in the viewable space 308 without clipping such as the clipping shown in FIG. 2. More particularly, according to various embodiments, the control system 102 is configured to display the visual information 108 on the curvilinear display surface 302 if the visual information 108 is configured for display on the curvilinear display surface 302. According to various other embodiments, the control system 102 is configured to modify the visual information 108 displayed by the display system 300 and to display the modified visual information 108' corresponding to the virtual object 204 on the curvilinear display surface 302. Thus, the virtual object 204 can appear to be grounded when displayed on the curvilinear display surface 302 and viewed from the viewpoint 310.

The curvilinear display surface 302 in some embodiments has a top edge 316. The curvilinear display surface 302 is configured as a substantially continuous curved surface that slopes forward and toward the viewpoint 310 such that a front edge 318 may be located at a position horizontally closer to the viewpoint 310 relative to the horizontal position of the top edge 316. Because the curvilinear display surface 302 is substantially continuous and/or a unitary structure, the regions and/or portions referred to below with respect to the curvilinear display surface 302 must be understood as referring to the shape or contour of the curvilinear display surface 302, and not to distinct or separate surfaces.

The curvilinear display surface 302 can include region or portion configured as a slanted backdrop portion 320. In some embodiments, at least a portion of the slanted backdrop portion 320 can be oriented in a substantially vertical orientation along the illustrated y-axis y. In other embodiments, at least a portion of the slanted backdrop portion 320 can slope away from the viewpoint 310, at least slightly, to further improve the perceived virtual presence of the display system 300. Thus, a point or row of points on the curvilinear display surface 302 may be tangential to the illustrated y-axis y at some vertical location on the curvilinear display surface 302.

The curvilinear display surface 302 also can include a region or portion configured as a substantially horizontally oriented viewing portion 322 that can be oriented, at least partially, along the illustrated x-axis x. An angle α corresponding to a rotational angle between the y-axis y and the x-axis x, and therefore between a viewing surface at the slanted backdrop portion 320 and the viewing surface at the substantially horizontally oriented viewing portion 322, can be any desired angle. In some embodiments, the angle α is less than ninety degrees, substantially equal to ninety degrees, or greater than ninety degrees. Therefore, although the angle α is illustrated in FIG. 3 as being greater than ninety degrees, it should be understood that this embodiment is illustrative, and that other embodiments are possible and are contemplated, as described herein.

The curvilinear display surface 302 also can include a region or portion configured as a curved portion 324 that corresponds to a region of the curvilinear display surface 302 in which a bulk of the transition of the curvilinear display surface 302 from a substantially vertically aligned viewing surface to a substantially horizontally aligned viewing surfaces can occur. It should again be noted that while the curvilinear display surface 302 is described herein as having regions or portions, the curvilinear display surface 302 is a substantially continuous unitary surface, and that the curvature of the display surface 302 at any point between the top edge 316 and the front edge 318 may be expressed by one or more equations. Thus, the regions or portions refer to the shape and/or contour of the curvilinear display surface 302, and not to separate and/or distinct surfaces or other structures.

In one example embodiment, a vertical coordinate of the curvilinear display surface 302 can be expressed as a function of one or more of a height of the curvilinear display surface 302 and a distance from a horizontal location of the front edge 318 to a horizontal location of the top edge 316. For example, in one embodiment, a vertical coordinate of any point on the curvilinear display surface 302 can be expressed as $H_M \exp(-C \times \Delta D)$, wherein C corresponds to a curvature parameter, $H_M$ corresponds to a maximal height of the curvilinear display surface 302, and $\Delta D$ corresponds to a horizontal distance between a horizontal location of the front edge 318 and horizontal location of the top edge 316, measured along the x-axis x. According to one example embodiment, C is approximately equal to 0.14. It should be understood that this embodiment is only an example, and should not be construed as being limiting in any way.

Figure 4:
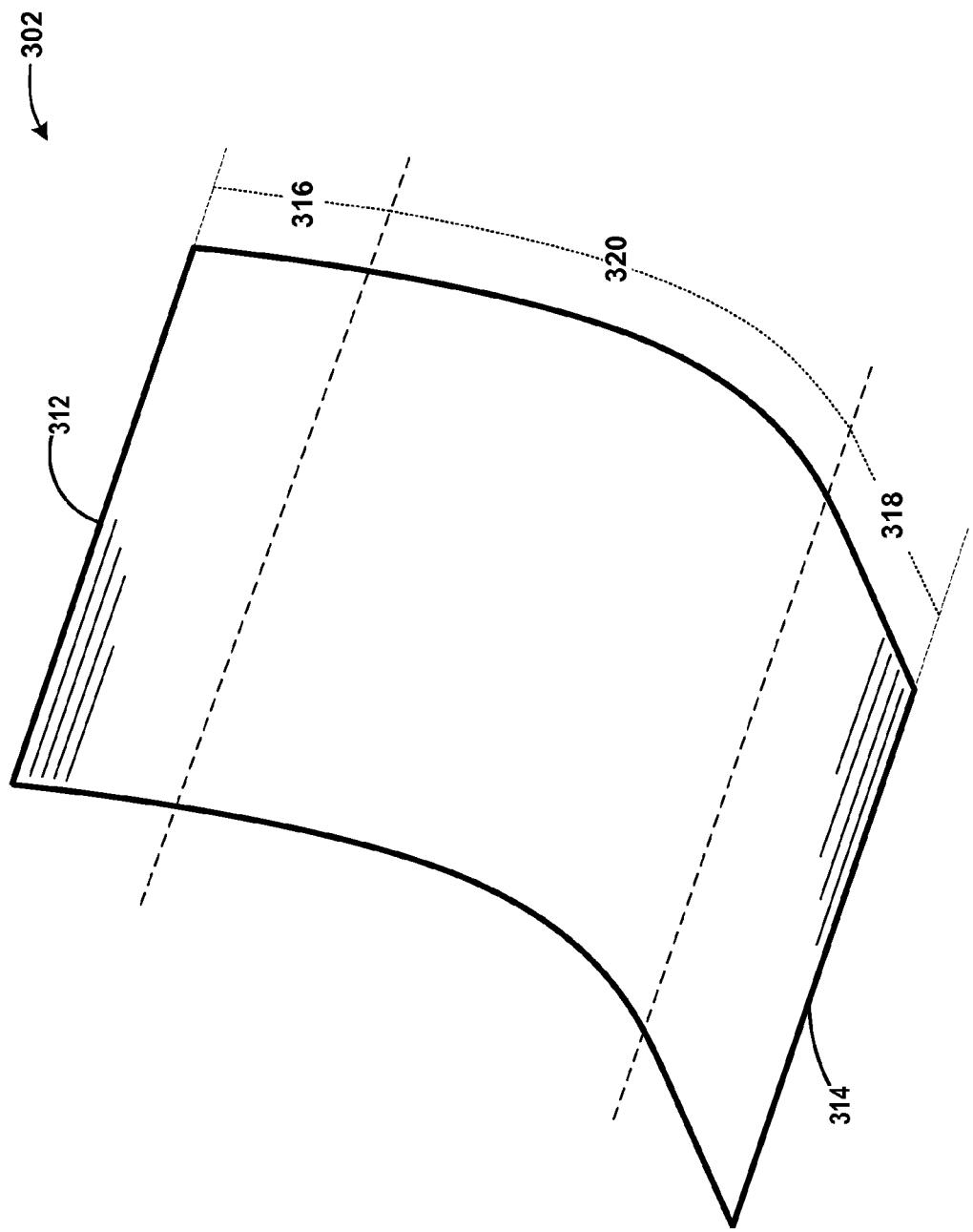
FIG. 4 is a line drawing illustrating a perspective view of a curvilinear display surface.

With additional reference now to FIG. 4, one illustrative embodiment of the curvilinear display surface 302 will be described. More particularly, FIG. 4 is a line drawing illustrating a perspective view of a curvilinear display surface such as the curvilinear display surface 302 illustrated in FIG. 3. According to various embodiments, the size of the curvilinear display surface 302 and the materials used to form the curvilinear display surface 302 vary depending upon the intended use of the curvilinear display surface 302. For example, in some embodiments the curvilinear display surface 302 is configured as a desktop or surface-mountable display for home, office, business, or other uses. In other embodiments, the curvilinear display surface 302 is configured as a display for a movie theater, museum, historical site or landmark, convention center, lecture hall, and/or other venue. In yet other embodiments, the curvilinear display surface 302 is configured as a portable display for a mobile computing device such as a laptop, tablet, smartphone, and the like.

In one contemplated implementation, the curvilinear display surface 302 can be formed from semi-rigid material that can be collapsed. The collapsed curvilinear display surface 302 can be stored or carried, or stowed into a pocket, carrying case, laptop bag, and/or other structure or location associated with a smartphone or other portable computing device such as a laptop. The curvilinear display surface 302 can be deployed and used at any suitable time and location. When the curvilinear display surface 302 is deployed, the material used to form the curvilinear display surface 302 can return to a desired shape and configuration. It should be understood that this embodiment is only an example, and should not be construed as being limiting in any way.

Similarly, the curvilinear display surface 302 can be formed from any suitable materials. For example, in some embodiments, the curvilinear display surface 302 is formed from one or more rigid, semi-rigid, or soft materials. Thus, the curvilinear display surface 302 can be configured as a collapsible or stowable display surface, if desired, or the curvilinear display surface 302 can be formed as an immobile or fixed display surface. In one embodiment, the curvilinear display surface 302 can be formed from a layer of plastic, metal, or other suitable substrate, and can be coated with a coating or paint such as a high-gain aluminized paint or other material. The substrate can be mounted to a metal, wood, plastic, or other suitably designed frame or support structure, if desired. In other embodiments, the curvilinear display surface 302 is self-luminous, for example, an LED display, a plasma display, an OLED display, and the like. In yet other embodiments, the curvilinear display surface 302 is an LCD display or other light modulating device. It should be understood that these embodiments are only examples, and should not be construed as being limiting in any way. It can be appreciated from the embodiment illustrated in FIG. 4, that the curvilinear display surface 302 is a substantially continuous unitary surface.

Figure 5:
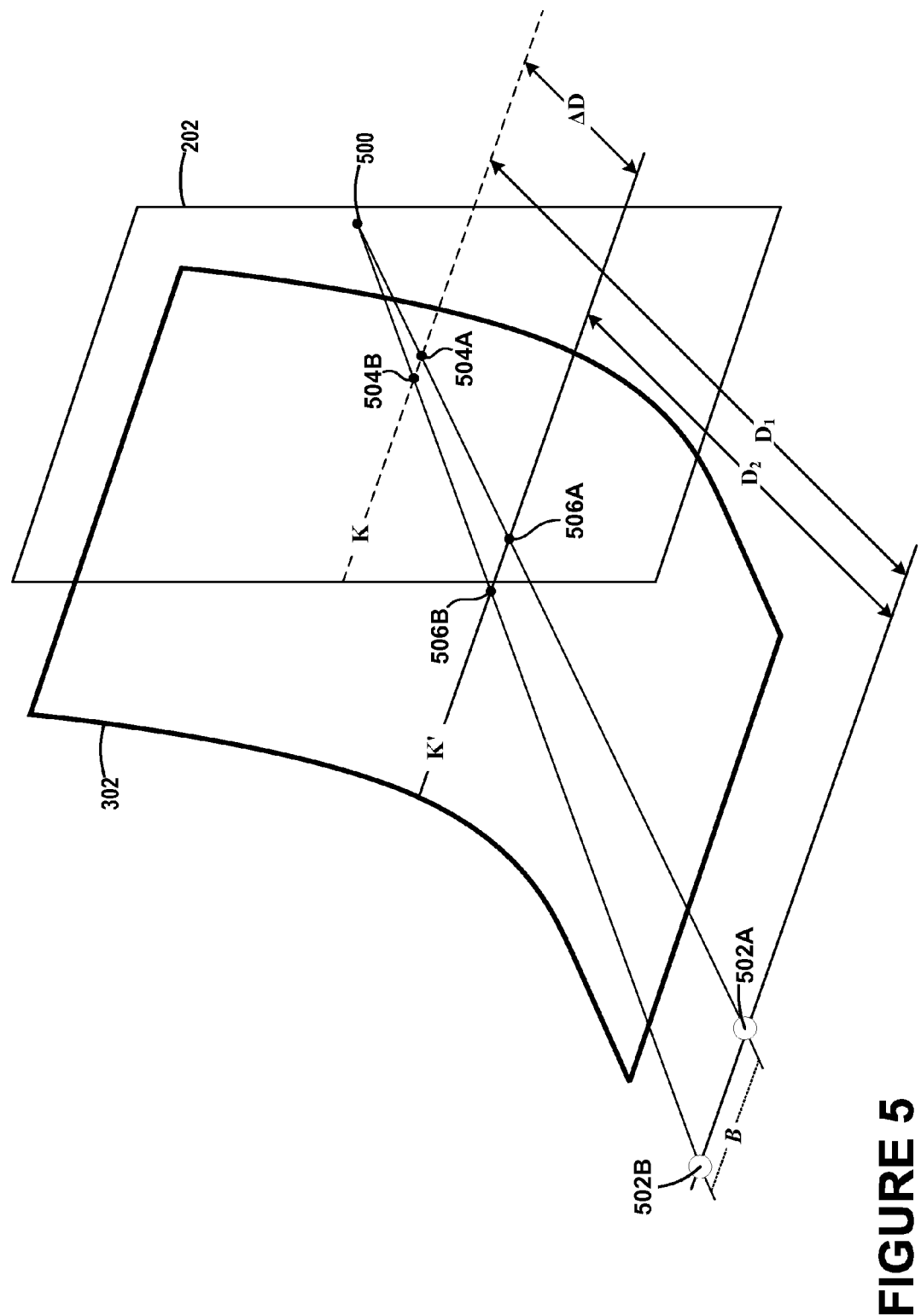
FIG. 5 is a schematic diagram illustrating modification of visual information for display on curvilinear display surfaces.

Turning now to FIG. 5, a schematic diagram illustrating modification of visual information 108 (not illustrated in FIG. 5) for display on curvilinear display surfaces 302 arranged according to at least some embodiments presented herein will be described. More particularly, FIG. 5 illustrates a 3D object 500 projected onto or displayed by each of a reference surface such as the display surface 202 and an actual surface such as the curvilinear display surface 302. A pair of eyes 502A, 502B (herein collectively referred to as eyes 502) having an interocular distance of B are illustrated as viewing the 3D object 500 projected onto or displayed by the display surface 202 and/or the curvilinear display surface 302.

A distance $D_1$ can be expressed as a distance between the eyes 502 and/or another viewer or viewpoint, and the display surface 202. Similarly, a distance $D_2$ can correspond to a distance between the eyes 502 and the curvilinear display surface 302. As shown, $\Delta D$ therefore can correspond to a difference in distance between the first distance $D_1$, and the second distance $D_2$. According to various embodiments, the control system 102 can be configured to modify the visual information 108 corresponding to the displayed object 500 based, at least partially, upon the known or determined D and $\Delta D$ values and/or relationships described and illustrated in FIG. 5, as will be described in more detail below with reference to FIG. 6. It should be understood that this embodiment is only an example, and should not be construed as being limiting in any way.

Additional relationships between the display surface 202 and the curvilinear display surface 302 are depicted in FIG. 5. The object 500, which can correspond to the visual information 108 projected onto or by the display surface 202 and/or the curvilinear display surface 302, can be perceived by the eyes 502 as the 3D object 500. In particular, the 3D object 500 is provided, in the illustrated embodiment, by a left image 504A and a right image 504B (images 504) displayed at or by the display surface 202. As explained above, the left image 504A and the right image 504B can be displayed at or by the display surface 202 at a distance $D_1$ from the eyes 502.

Similarly, a left image 506A and a right image 506B (images 506) can be displayed at or by the curvilinear display surface 302. As explained above, the left image 506A and the right image 506B can be displayed at or by the curvilinear display surface 302 at a distance $D_2$ from the eyes 502. Thus, FIG. 5 illustrates that a first disparity associated with the images 504 can be less than a second disparity associated with the images 506. The disparities correspond to a distance between the images 504 at the line K and a distance between the images 506 at the line K'. As such, the control system 102 is configured to modify the visual information 108 to also take the disparity associated with the display surface 202 and the curvilinear display surface 302 into account, as will be explained in more detail below with reference to FIG. 6.

Figure 6:
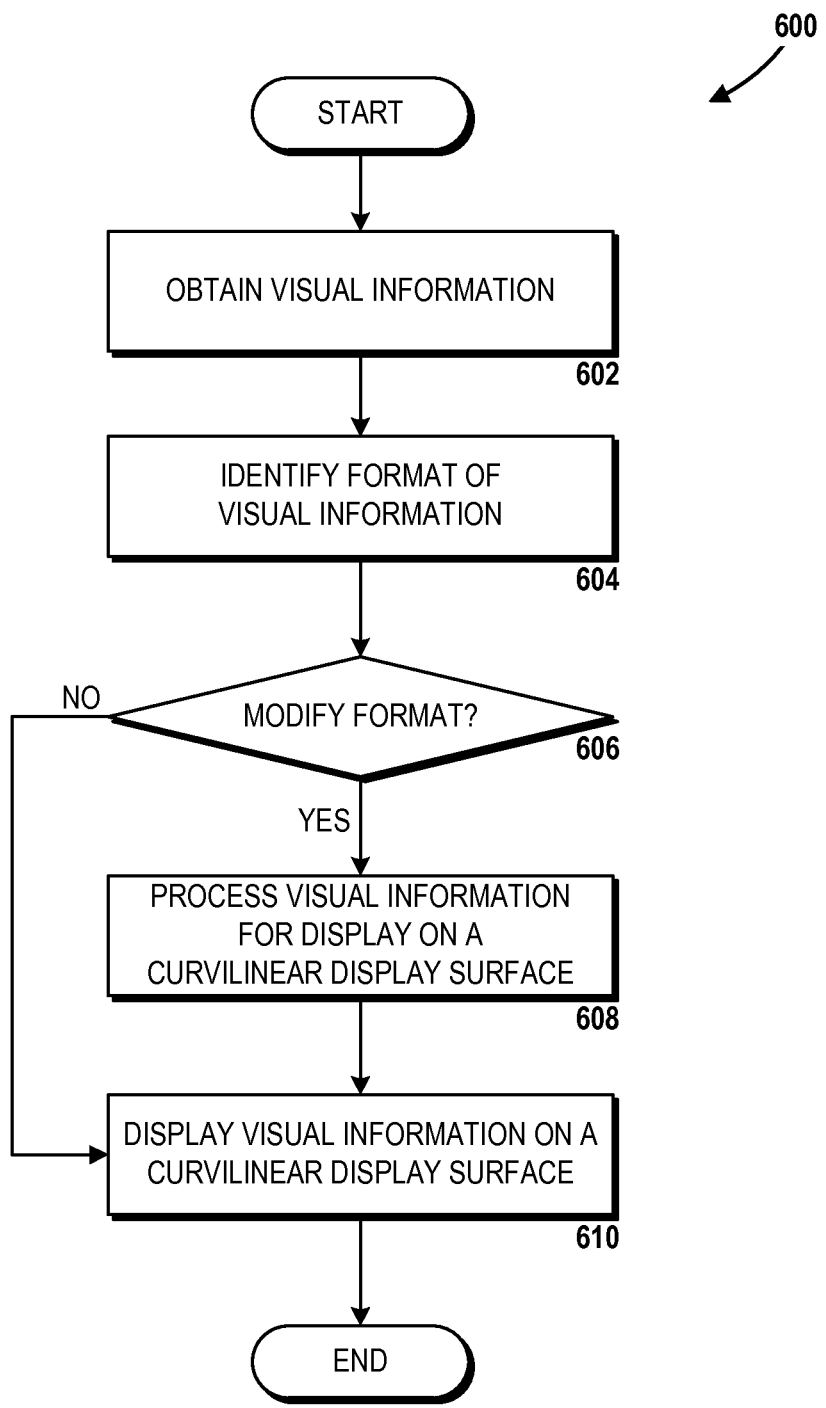
FIG. 6 is a flow diagram illustrating an example process for displaying visual information on curvilinear display surfaces.

Turning now to FIG. 6, a flow diagram illustrating an example process 600 for displaying visual information on curvilinear display surfaces arranged according to at least some embodiments presented herein will be described. It should be understood that the operations of the process 600 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated process 600 can be ended at any time and need not be performed in its entirety. Some or all operations of the process 600, and/or substantially equivalent operations, can be performed by execution of computer-readable instructions included on a computer storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

For purposes of illustrating and describing the concepts of the present disclosure, the process 600 is described as being performed by the control system 102. It should be understood that this embodiment is only an example, and should not be viewed as being limiting in any way. Furthermore, as explained above with reference to FIG. 1, the control system 102 can execute one or more applications including, but not limited to, the display control module 104 and the projection control 106 to provide the functionality described herein.

The process 600 begins at operation 602 (obtain visual information), wherein the control system 102 obtains visual information 108 from a source 110. As explained above, the visual information 108 can include static or animated content, and the source 110 can correspond to almost any type of device or source associated with the visual information 108. It should be understood that the visual information 108 can be transmitted to the control system 102, can be broadcast to any number of devices including the control system 102, and/or can be made accessible to the control system 102. Thus, the operation 602 can include receiving the visual information 108, downloading the visual information 108, retrieving the visual information 108, and/or otherwise obtaining the visual information 108.

From operation 602, the process 600 proceeds to operation 604 (identify format of visual information), wherein the control system 102 identifies a format in which the visual information 108 is obtained. For example, the control system 102 can analyze the visual information 108 to determine if the visual information 108 is configured for display on a substantially planar display surface such as the display surface 202 illustrated in FIG. 2. The control system 102 can determine that the visual information 108 is configured for display on a substantially planar display surface by determining, for example, that rows and/or columns of the visual information 108 are consistent with one another in terms of size and/or content, and/or that the number of pixels in each row and/or column of the visual information is consistent. This is only an example, and should not be construed as being limiting in any way.

The control system 102 also can determine that the visual information 108 is configured for display on a curvilinear display such as the curvilinear display surface 302 illustrated in FIGS. 3-4. As such, the control system 102 may determine that the visual information 108 is ready for display at the display device 112, as will be explained in more detail below. The control system 102 also can be configured to detect that the visual information 108 is skewed or distorted for display on a particularly shaped or formatted surface, or that the visual information 108 is not skewed or distorted in any way. Other methods or processes for determining how the visual information 108 is formatted are contemplated, but are not described herein in detail for the sake of brevity.

From operation 604, the process 600 proceeds to operation 606 (modify format), wherein the control system 102 determines, based upon the format detected in operation 604, if the format of the visual information 108 is to be modified. According to various embodiments, the control system 102 determines that the format of the visual information 108 is to be modified if the visual information 108 is not formatted for display on a curvilinear display such as the display device 112 or the curvilinear display surface 302. Additionally, or alternatively, the control system 102 can determine that the format of the visual information 108 is not to be modified if the visual information 108 is configured for display on a curvilinear display such as the display device 112 or the curvilinear display surface 302.

If the control system 102 determines, in operation 606, that the format of the visual information 108 is to be modified, the process 600 proceeds to operation 608 (process visual information for display on a curvilinear display surface), wherein the control system 102 processes the visual information 108 for display. As explained above with reference to FIGS. 1-5, the control system 102 can process the visual information for display on the display device 112 or the curvilinear display surface 302, and/or to take into account distortions or other optical or environmental interference expected if the visual information 108 is to be projected. Correction for projection-based distortions and/or interference such as keystone correction, and the like, is not described herein in detail.

In some embodiments, the visual information 108 is modified based upon one or more equations or formulae to take into account a difference between a reference surface such as the display surface 202 illustrated in FIGS. 2 and 5, and the actual surface on which the visual information 108 will be displayed such as the curvilinear display surface 302 illustrated in FIGS. 3-5. More particularly, the one or more formulae can be applied to the visual information 108 to identify a difference between a viewpoint such as the viewpoint 206 and a reference display such as the display surface 202 and a difference between the viewpoint 310 and the actual surface such as the curvilinear display surface 302, as illustrated and described above with reference to FIG. 5. In one implementation, the control system 102 modifies the visual information 108 to warp, skew, or otherwise modify the visual information 108 to obtain the modified visual information 108'. The modified visual information 108' can be displayed on a display surface such as the display device 112 or the curvilinear display surface 302. In one implementation, the control system 102 modifies the visual information 108 according to a disparity (d') calculated for the actual surface used to display the modified visual information 108', as explained above with reference to FIG. 5.

According to various embodiments, the visual information 108 includes a number of horizontal rows of image data. The control system 102 can process the visual information 108 to shift some, all, or none of the horizontal rows of the visual information 108, and to output the modified visual information 108' such that the modified visual information 108' is properly configured for display on the actual display surface. More particularly, in one embodiment, the disparity d' is expressed as $d(1-(\Delta D/D))+B(\Delta D/D)$. D can correspond to a distance between an anticipated viewer or viewpoint and the reference display such as the display surface 202 illustrated in FIG. 2, $\Delta D$ can correspond to a distance between the display surface 202 and a new location for a given row in the visual information 108 presented on the curvilinear display surface 302, and B can represent interocular distance. In one embodiment, the control system 102 assumes that $D \gg \Delta D$. As such, the control system 102 can modify the visual information 108 by shifting one or more rows of the visual information 108. It should be understood that this embodiment is only an example, and should not be construed as being limiting in any way.

If the control system 102 determines, in operation 606, that the format of the visual information 108 is not to be modified, and/or from operation 608, the process 600 proceeds to operation 610 (display visual information on a curvilinear display), wherein the control system 102 outputs the visual information 108 or the modified visual information 108' for display at the display device 112 and/or the curvilinear display surface 302. After operation 610, the process 600 may either repeat (e.g., periodically, continuously, or on demand as needed) or terminate.

In some embodiments, a method for displaying visual information includes computer-implemented operations for obtaining the visual information, the visual information being configured for display on a first display surface, processing the visual information for display on a second display surface, and displaying the visual information on the second display surface. The second display surface includes a substantially continuous unitary surface. The continuous unitary surface has a shape or contour that can be described as having a first display region or portion oriented in a first orientation, a second display region or portion including a curvilinear region or portion adjacent to the first display region or portion, and a third region or portion adjacent to the second region or portion. The third display region or portion may be oriented in a second orientation.

A viewing surface of the second display at the first display region or portion may be substantially perpendicular relative to the viewing surface at the third display region or portion. An angle formed between the viewing surface at the first display region or portion and the viewing surface at the third display region or portion may be greater than ninety degrees. The viewing surface at the grounded curvilinear region or portion has a curved shape. Thus, the three regions or portions described herein provide a substantially continuous unitary display surface that varies in shape and orientation between the first display region or portion of the second display surface and the third display region or portion of the second display surface. It bears repeating that although the second display surface is described above as having three regions or portions, that the second display surface is a substantially continuous and unitary surface, and that the regions or portions referred to herein refer to the shape or contour of the second display surface, not to three separate or distinct display surfaces.

In some implementations, the visual information includes rows, and processing the image includes calculating a disparity for each of the rows of the visual information to compensate for a difference between a first shape associated with the first display surface and a second shape associated with the second display surface. The disparity may be calculated, at least partially, based upon a first distance between an anticipated first viewing point and the first display surface and a second distance between an anticipated second viewing point and the second display surface. The visual information can include three-dimensional visual information configured for display on a single display surface. The visual information may be projected using a single projector. The visual information also may be generated using an imaging system built into the second display surface. Processing the visual information also can include keystone-correcting the visual information to correct for anticipated distortion during projection of the visual information on the second display surface. It should be understood that the above embodiments are only examples, and should not be construed as being limiting in any way.

Figure 7A:
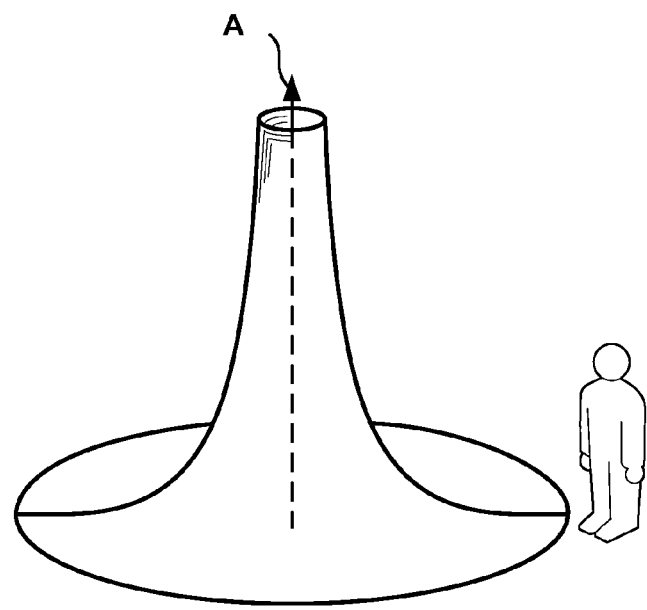
FIGS. 7A-7B are line drawings illustrating example curvilinear display surfaces.

In some embodiments of the concepts and technologies disclosed herein, a curvilinear display surface is configured as a "view-in" display, as illustrated in FIG. 7A. More particularly, the curvilinear display surface can be configured as a substantially continuous surface that provides viewable display space that is curved about a vertical axis A. Thus, in some embodiments a viewer can walk or otherwise travel around the "view-in" display and look into the "view-in" display. For example, a viewer can walk around a virtual object displayed on the "view-in" display to see an item such as an automobile, a sculpture, a historical artifact, a building, and/or any other desired object or information from various angles and/or viewpoints.

Figure 7B:
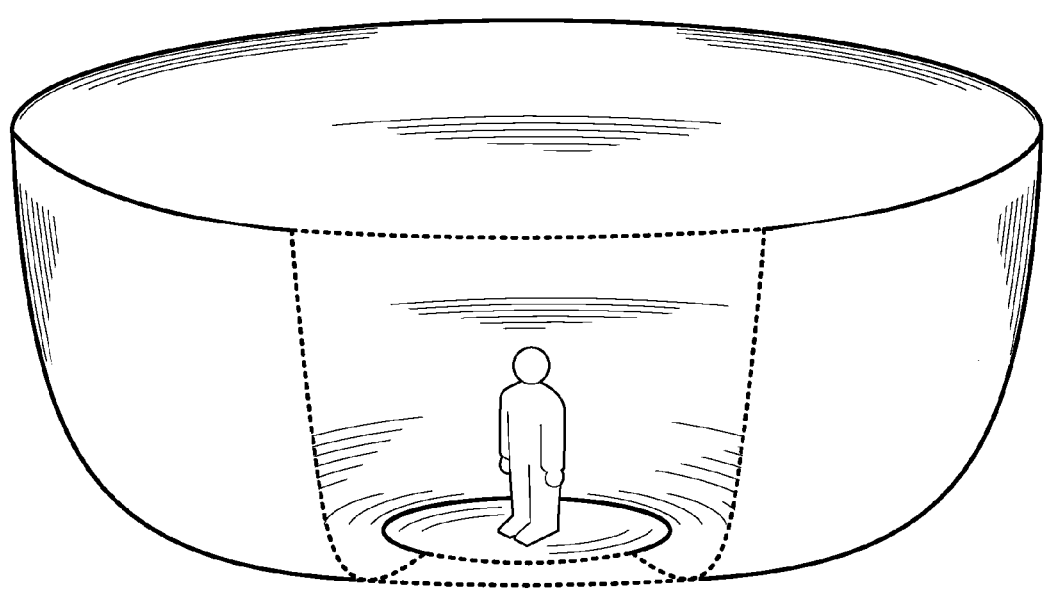

In other embodiments, the curvilinear display surface is configured as a "view-out" display, as illustrated in FIG. 7B. The curvilinear display surface can be configured as a substantially continuous display surface that provides viewable display space along a path such as a walkway or sidewalk. Although not illustrated as being curved in FIG. 7B, it should be understood that the curvilinear display surface also can be curved about a vertical axis to provide an immersive experience to the viewer, if desired. Thus, it can be appreciated that a viewer can look out at the "view-out" display. Thus, a viewer can turn around or otherwise view various portions of the display to view different viewpoints and/or scenes depicted in the visual information. For example, a viewer can look out at the "view-out" display to see various views of an environment in which the viewer is virtually immersed such as a room, an outdoor location, other scenes, and the like. In some embodiments, a wall or other surface is configured as a combination of one or more "view-in" and/or "view-out" displays, thus allowing various views and/or effects to be presented to a viewer while traveling or looking along a viewing surface. It therefore should be understood that the above-described embodiments are illustrative, and should not be construed as being limiting in any way.

Figure 8:
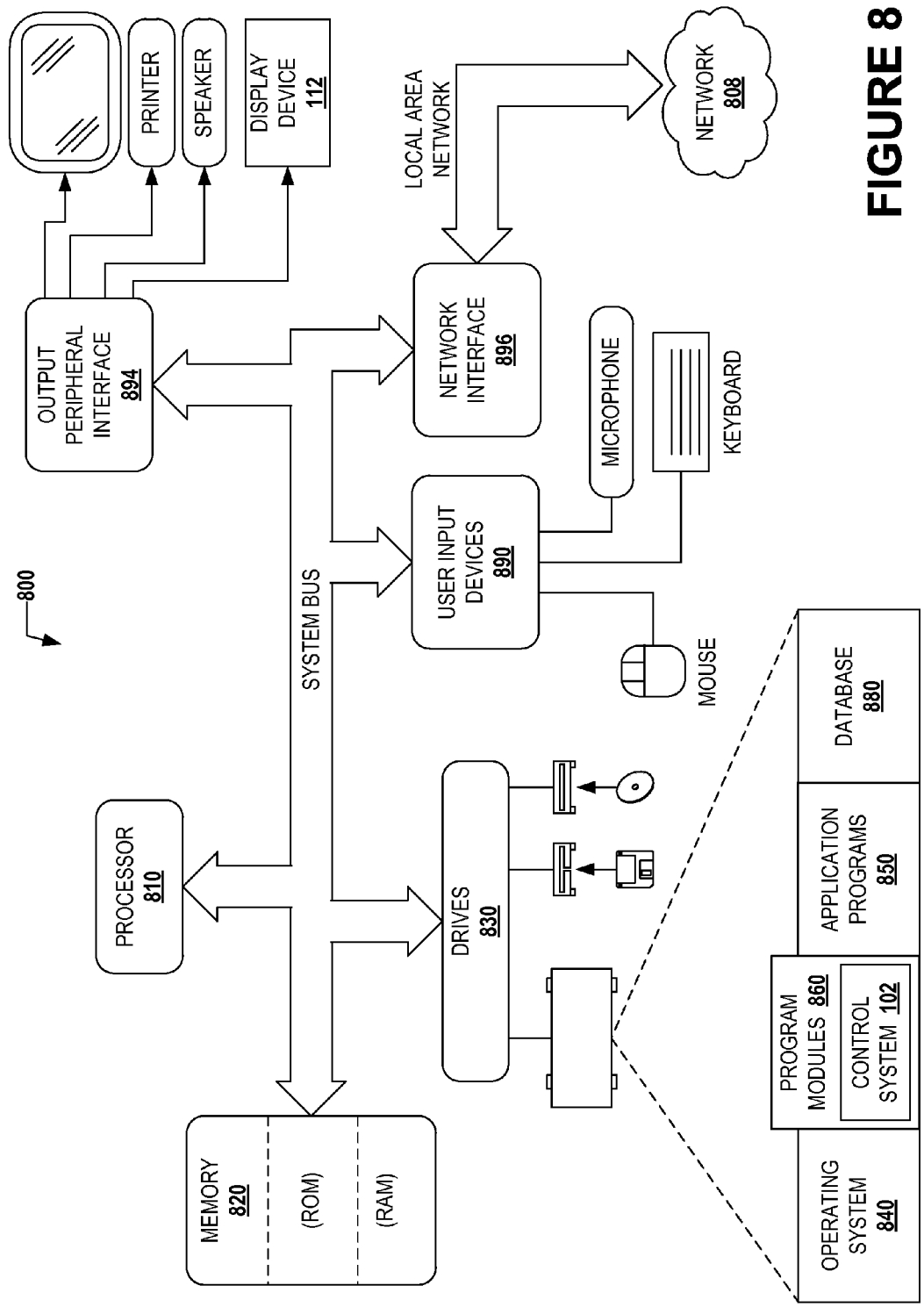
FIG. 8 is a block diagram illustrating an example computer capable of displaying visual information on curvilinear display surfaces.

FIG. 8 is a block diagram illustrating an example computer 800 capable of displaying visual information on curvilinear display surfaces arranged according to at least some embodiments presented herein. As depicted, the computer 800 includes a processor 810, a memory 820 and one or more drives 830. The computer 800 may be implemented as a conventional computer system, an embedded control computer, a laptop, or a server computer, a mobile device, an STB, a kiosk, a vehicular information system, a mobile telephone, a customized machine, or other hardware platform.

The drives 830 and their associated computer storage media, provide storage of computer readable instructions, data structures, program modules and other data for the computer 800. The drives 830 can include an operating system 840, application programs 850, program modules 860, and a database 880. The program modules 860 may include a control system 102. The control system 102 may be adapted to execute the process 600 for displaying visual information on curvilinear display surfaces as described in greater detail above (e.g., see previous description with respect to one or more of FIGS. 1-6). The computer 800 further includes user input devices 890 through which a user may enter commands and data. The input devices 890 can include one or more of an electronic digitizer, a microphone, a keyboard and pointing device, commonly referred to as a mouse, trackball or touch pad. Other input devices may include a joystick, game pad, satellite dish, scanner, other devices, and the like.

These and other input devices can be coupled to the processor 810 through a user input interface that is coupled to a system bus, but may be coupled by other interface and bus structures, such as a parallel port, game port or a universal serial bus ("USB"). Computers such as the computer 800 also may include other peripheral output devices such as speakers, printers, displays, display devices 112, and/or other devices, which may be coupled through an output peripheral interface 894 or the like.

The computer 800 may operate in a networked environment using logical connections to one or more computers, such as a remote computer (not illustrated), sources 110 (not shown in FIG. 8), display devices 112, and/or other devices operating on or in communication with a network 808 coupled to a network interface 896. The remote computer may be a personal computer, a server, a router, a network PC, a peer device or other common network node, and can include many or all of the elements described above relative to the computer 800. Networking environments are commonplace in offices, enterprise-wide area networks ("WAN"), local area networks ("LAN"), intranets, and the Internet.

When used in a LAN or WLAN networking environment, the computer 800 may be coupled to the LAN through the network interface 896 or an adapter. When used in a WAN networking environment, the computer 800 typically includes a modem or other means for establishing communications over the WAN, such as the Internet or the network 808. The WAN may include the Internet, the illustrated network 808, various other networks, or any combination thereof. It will be appreciated that other mechanisms of establishing a communications link, ring, mesh, bus, cloud, or network between the computers may be used.

According to some embodiments, the computer 800 may be coupled to a networking environment. The computer 800 may include one or more instances of a physical computer-readable storage medium or media associated with the drives 830 or other storage devices. The system bus may enable the processor 810 to read code and/or data to/from the computer storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 820, whether characterized as RAM, ROM, flash, or other types of volatile or nonvolatile memory technology. The media may also represent secondary storage, whether implemented as the storage drives 830 or otherwise. Hard drive implementations may be characterized as solid state, or may include rotating media storing magnetically-encoded information.

The storage media may include one or more program modules 860. The program modules 860 may include software instructions that, when loaded into the processor 810 and executed, transform a general-purpose computing system into a special-purpose computing system. As detailed throughout this description, the program modules 860 may provide various tools or techniques by which the computer 800 may participate within the overall systems or operating environments using the components, logic flows, and/or data structures discussed herein.

The processor 810 may be constructed from any number of transistors or other circuit elements, which may individually or collectively assume any number of states. More specifically, the processor 810 may operate as a state machine or finite-state machine. Such a machine may be transformed to a second machine, or specific machine by loading executable instructions contained within the program modules 860. These computer-executable instructions may transform the processor 810 by specifying how the processor 810 transitions between states, thereby transforming the transistors or other circuit elements constituting the processor 810 from a first machine to a second machine. The states of either machine may also be transformed by receiving input from the one or more user input devices 890, the network interface 896, other peripherals, other interfaces, or one or more users or other actors. Either machine may also transform states, or various physical characteristics of various output devices such as printers, speakers, video displays, or otherwise.

Encoding the program modules 860 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 860 may transform the physical state of the semiconductor memory 820 when the software is encoded therein. For example, the software may transform the state of transistors, capacitors, or other discrete circuit elements constituting the semiconductor memory 820.

As another example, the storage media may be implemented using magnetic or optical technology such as drives 830. In such implementations, the program modules 860 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description. As used in the claims, the phrase "computer storage medium," and variations thereof, does not include waves, signals, and/or other transitory and/or intangible communication media, per se.

Figure 9:
FIG. 9 is a schematic diagram illustrating computer program products for displaying visual information on curvilinear display surfaces, all arranged according to at least some embodiments presented herein.

FIG. 9 is a schematic diagram illustrating computer program products 900 for displaying visual information on curvilinear display surfaces arranged according to at least some embodiments presented herein. An illustrative embodiment of the example computer program product 900 is provided using a signal bearing medium 902, and may include at least one instruction 904. The at least one instruction 904 may include: one or more instructions for obtaining stereoscopic three-dimensional visual information; or one or more instructions for displaying the visual information on a substantially continuous curvilinear display surface having a first shape at a first region of the curvilinear display surface, a second shape at a second region of the curvilinear display surface, and a third shape at a third region of the curvilinear display surface, the first region being oriented in a first orientation, the second region having a region of the curvilinear display surface having a curved shape and being adjacent the first region, and the third region being adjacent the second region and being oriented in a second orientation, wherein a viewing surface at the first region is substantially perpendicular to the viewing surface at the third region. In some embodiments, the signal bearing medium 902 of the one or more computer program products 900 include a computer readable medium 906, a recordable medium 908, and/or a communications medium 910.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having"

should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method to display stereoscopic three-dimensional visual information, the method comprising:
    displaying stereoscopic three-dimensional visual information on a substantially continuous curvilinear display surface having a top edge, a front edge, a first shape at a first region of the curvilinear display surface, a second concave shape at a second region of the curvilinear display surface, and a third shape at a third region of the curvilinear display surface, the second region located between the first region and the third region,
    wherein the second region curves in a substantially continuous concave upward curvilinear manner between the third region and the first region in accordance with a curvature parameter, wherein corresponding points along a first side of the display surface and a second side of the display surface in the second region are approximately equidistant, wherein a viewing surface at the first region is substantially perpendicular to the viewing surface at the third region and wherein the front edge is closer to a viewpoint as compared to the top edge.

2. The method of claim 1, further comprising processing the stereoscopic three-dimensional visual information, wherein the stereoscopic three-dimensional visual information comprises rows, and wherein processing the stereoscopic three-dimensional visual information comprises calculating a disparity for each of the rows of the stereoscopic three-dimensional visual information to compensate for a difference between a first shape associated with a substantially planar display surface and a second shape associated with the curvilinear display surface.

3. The method of claim 2, wherein the disparity is calculated, at least partially, based upon a first distance between a first anticipated viewing point associated with the substantially planar display surface and a second distance between a second anticipated viewing point associated with the curvilinear display surface.

4. The method of claim 1, wherein the stereoscopic three-dimensional visual information comprises multiview stereoscopic three-dimensional visual information.

5. The method of claim 1, wherein the stereoscopic three-dimensional visual information comprises a representation of an object, and wherein the object appears grounded when viewed on the curvilinear display surface.

6. The method of claim 1, wherein displaying the stereoscopic three-dimensional visual information on the curvilinear display surface comprises projecting the stereoscopic three-dimensional visual information using a single projector.

7. The method of claim 1, wherein displaying the stereoscopic three-dimensional visual information on the curvilinear display surface comprises generating an image with an imaging system built into the curvilinear display surface.

8. The method of claim 1, wherein a vertical coordinate of the curvilinear display surface is represented as $H_M \exp(-C \times \Delta D)$, and wherein C comprises a curvature parameter, $H_M$ comprises a maximal height of the curvilinear display surface, and ΔD comprises a distance from a rearmost portion of the curvilinear display surface to a front edge of the curvilinear display surface.

9. An apparatus configured to display stereoscopic three-dimensional visual information, the apparatus comprising:
   a substantially continuous curvilinear display surface having a top edge, a front edge, a first shape at a first region of the curvilinear display surface, a second concave shape at a second region of the curvilinear display surface, and a third shape at a third region of the curvilinear display surface, the second region located between the first region and the third region, wherein the second region curves in a substantially continuous concave upward curvilinear manner between the third region and the first region in accordance with a curvature parameter, wherein corresponding points along a first side of the display surface and a second side of the display surface in the second region are approximately equidistant, wherein a viewing surface at the first region is substantially perpendicular to the viewing surface at the third region and wherein the front edge is closer to a viewpoint as compared to the top edge.

10. The apparatus of claim 9, wherein a vertical coordinate of the curvilinear display surface is represented as $H_M \exp(-C \times \Delta D)$, and wherein
    C comprises a curvature parameter,
    $H_M$ comprises a maximal height of the curvilinear display surface, and
    ΔD comprises a distance from a rearmost portion of the viewing surface at the first region to a front edge of the viewing surface at the third region.

11. The apparatus of claim 10, wherein the curvature parameter comprises a value of about 0.14.

12. The apparatus of claim 9, wherein at least part of the display surface at the first region is substantially planar, and wherein at least part of the display surface at the third region is substantially planar.

13. The apparatus of claim 12, wherein an angle formed between the viewing surface at the first region and the viewing surface at the third region is greater than ninety degrees.

14. The apparatus of claim 13, wherein the stereoscopic three-dimensional visual information comprises multiview stereoscopic three-dimensional visual information.

15. The apparatus of claim 9, further comprising an imaging system for displaying a single continuous image, portions of which are simultaneously displayed on the display surface at the first region, the second region, and the third region.

16. The apparatus of claim 9, wherein at least a portion of the display surface is formed from a semi-rigid material.

17. The apparatus of claim 16, wherein the display surface at one or more of the first region, the second region, or the third region is connected to a portable computing device, and wherein the visual information comprises content configured for display at the portable computing device.

18. A non-transitory computer storage medium having computer executable instructions stored thereon that, when executed by a computer, cause the computer to:
    display stereoscopic three-dimensional visual information on a substantially continuous curvilinear display surface having a top edge, a front edge, a first shape at a first region of the curvilinear display surface, a second concave shape at a second region of the curvilinear display surface, and a third shape at a third region of the curvilinear display surface, the second region located between the first region and the third region,
    wherein the second region curves in a substantially continuous concave upward curvilinear manner between the third region and the first region in accordance with a curvature parameter, wherein corresponding points along a first side of the display surface and a second side of the display surface in the second region are approximately equidistant, wherein a viewing surface at the first region is substantially perpendicular to the viewing surface at the third region and wherein the front edge is closer to a viewpoint as compared to the top edge.

19. The non-transitory computer storage medium of claim 18, further comprising computer executable instructions stored thereon that, when executed by the computer, cause the computer to process the stereoscopic three-dimensional visual information, wherein the stereoscopic three-dimensional visual information comprises rows, and wherein processing the stereoscopic three-dimensional visual information comprises calculating a disparity for each of the rows of the stereoscopic three-dimensional visual information to compensate for a difference between a first shape associated with a substantially planar display surface and a second shape associated with the curvilinear display surface.

20. The non-transitory computer storage medium of claim 19, wherein the disparity is calculated, at least partially, based upon a first distance between a first anticipated viewing point associated with the substantially planar display surface and a second distance between a second anticipated viewing point associated with the curvilinear display surface.

21. The non-transitory computer storage medium of claim 18, wherein the stereoscopic three-dimensional visual information comprises multiview stereoscopic three-dimensional visual information.

22. The non-transitory computer storage medium of claim 18, wherein the stereoscopic three-dimensional visual information comprises a representation of an object, and wherein the object appears grounded when viewed on the curvilinear display surface.

23. The non-transitory computer storage medium of claim 18, wherein displaying the stereoscopic three-dimensional visual information on the curvilinear display surface comprises projecting the stereoscopic three-dimensional visual information using a single projector.

24. The non-transitory computer storage medium of claim 18, wherein displaying the stereoscopic three-dimensional visual information on the curvilinear display surface comprises generating an image with an imaging system built into the curvilinear display surface.

25. The non-transitory computer storage medium of claim 18, wherein a vertical coordinate of the curvilinear display surface is represented as $H_M \exp(-C \times \Delta D)$, and wherein C comprises a curvature parameter, $H_M$ comprises a maximal height of the curvilinear display surface, and ΔD comprises a distance from a rearmost portion of the curvilinear display surface to a front edge of the curvilinear display surface.

* * * * *